(12) United States Patent
Naito

(10) Patent No.: US 11,177,936 B2
(45) Date of Patent: Nov. 16, 2021

(54) MESSAGE AUTHENTICATOR GENERATION APPARATUS

(71) Applicant: MITSUBISHI ELECTRIC CORPORATION, Tokyo (JP)

(72) Inventor: Yusuke Naito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 203 days.

(21) Appl. No.: 16/478,806

(22) PCT Filed: Feb. 22, 2017

(86) PCT No.: PCT/JP2017/006504
§ 371 (c)(1),
(2) Date: Jul. 17, 2019

(87) PCT Pub. No.: WO2018/154642
PCT Pub. Date: Aug. 30, 2018

(65) Prior Publication Data
US 2021/0135840 A1  May 6, 2021

(51) Int. Cl.
*H04L 29/06* (2006.01)
*H04L 9/06* (2006.01)
*H04L 9/32* (2006.01)

(52) U.S. Cl.
CPC .......... *H04L 9/0618* (2013.01); *H04L 9/3242* (2013.01)

(58) Field of Classification Search
CPC ........................... H04L 9/0618; H04L 9/3242
See application file for complete search history.

(56) References Cited

U.S. PATENT DOCUMENTS

| | | | |
|---|---|---|---|
| 5,673,318 | A | 9/1997 | Bellare et al. |
| 5,757,913 | A | 5/1998 | Bellare et al. |
| 10,326,589 | B2 | 6/2019 | Naito |
| 2009/0138710 | A1 | 5/2009 | Minematsu |
| 2009/0262925 | A1* | 10/2009 | Vijayarangan ........ H04L 9/0637 380/29 |

(Continued)

FOREIGN PATENT DOCUMENTS

| | | |
|---|---|---|
| JP | 6-315027 A | 11/1994 |
| JP | 2009-188794 A | 8/2009 |

(Continued)

OTHER PUBLICATIONS

Dworkin, NIST Special Publication 800-38B, "Recommendation for Block Cipher Modes of Operation: the CMAC Mode for Authentication", (May 2005), total of 29 pages.

(Continued)

*Primary Examiner* — Kevin Bechtel
*Assistant Examiner* — Hany S. Gadalla
(74) *Attorney, Agent, or Firm* — Birch, Stewart, Kolasch & Birch, LLP.

(57) ABSTRACT

A message authenticator generation apparatus (10) generates a message authenticator using a block cipher E having a block size n. A hash function unit (21) calculates a hash value w with a hash function h having an output length longer than n bits, taking as input a message M. A post-processing unit (22) performs calculations using the block cipher E on the hash value w calculated by the hash function unit (21), so as to calculate a message authenticator T not larger than the block size n for the message M.

8 Claims, 10 Drawing Sheets

(56) References Cited

U.S. PATENT DOCUMENTS

2010/0067686 A1* 3/2010 Minematsu ........... H04L 9/0618
                                                    380/28
2011/0211691 A1   9/2011 Minematsu
2012/0314857 A1  12/2012 Minematsu

FOREIGN PATENT DOCUMENTS

| JP | 2011-40932 A | 2/2011 |
| JP | 2011-250466 A | 12/2011 |
| JP | 2011-259389 A | 12/2011 |
| WO | WO 2007/052477 A1 | 5/2007 |
| WO | WO 2009/020060 A1 | 2/2009 |
| WO | WO 2010/024004 A1 | 3/2010 |
| WO | WO 2011/105367 A1 | 9/2011 |

OTHER PUBLICATIONS

Federal Information Processing Standards Publication 197, Advanced Encryption Standard (AES), Nov. 26, 2001, total of 51 pages.
International Search Report for PCT/JP2017/006504 (PCT/ISA/210) dated May 30, 2017.
Iwata et al., "OMAC: One-Key CBC MAC", Dec. 20, 2002, pp. 1-32.
Luykx et al., "A Mac Mode for Lightweight Block Ciphers", FSE 2016, total of 21 pages.
Office Action issued in Japanese Patent Application No. 2017-544969 dated Dec. 1, 2017.
Yasuda, "A New Variant of PMAC: Beyond the Birthday Bound", CRYPTO 2011. pp. 596-609.

* cited by examiner

MESSAGE AUTHENTICATOR GENERATION APPARATUS

TECHNICAL FIELD

The present invention relates to a message authentication algorithm using a block cipher.

BACKGROUND ART

Tampering of data can be detected using a message authentication algorithm.

The message authentication algorithm is a function that takes as input a message of an arbitrary length and a secret key, and outputs an authenticator T of a fixed length for detecting tampering.

Assume that a sender is Alice and a receiver is Bob. When performing communication using the message authentication algorithm, Alice and Bob share a secret key K in advance. Alice generates an authenticator T for a message M from the message M and the key K using the message authentication algorithm, and sends the message M and the authenticator T to Bob. Bob receives the message M and the authenticator T, and generates an authenticator T' from the message M and the key K using the message authentication algorithm. Bob determines that the message M has not been tampered with if a match exists between the received authenticator T and the generated authenticator T', and determines that the message M has been tampered with if no match exists.

There is a method of constructing a message authentication algorithm using a block cipher such as the Advanced Encryption Standard (AES) described in Non-Patent Literature 1.

A block cipher E is a function that takes as input a key K of k bits and a plaintext m of n bits and outputs a ciphertext c of n bits. This will be denoted as c=E(K, m). The size of the plaintext and the ciphertext of the block cipher is called a block size. When the key K is fixed, the block cipher is a permutation function of n bits.

When the message authentication algorithm is designed using the block cipher, a size t of an authenticator is less than or equal to a block size n of the block cipher. The message authentication algorithm using the block cipher consists of a hash function that compresses a message of an arbitrary length into a length of a certain fixed length, and a final process that transforms an output of the hash function into an authenticator oft bits. A key Kh and a key Kf are used in the hash function and the final function, respectively.

A typical message authentication algorithm using a block cipher is CMAC described in Non-Patent Literature 2.

The security of a message authentication algorithm is indicated using pseudorandomness. Pseudorandomness is security expressed by a difference between the probability that an identifier D will output a "1" after accessing the message authentication algorithm and observing output values and the probability that the identifier D will output a "1" after accessing a random function and observing output values, for the identifier D who outputs a 1-bit value of "0" or "1". This difference is called the advantage of pseudorandomness.

The security of a message authentication algorithm is also expressed using the number of authenticator invocations when the upper bound value of the advantage of pseudorandomness is ½. When the security of a message authentication algorithm is to be improved, this number of invocations is improved.

It is indicated in Non-Patent Literature 3 that the advantage of pseudorandomness of CMAC is less than or equal to $O((Lq)^2/2^n)$, where L is the number of block cipher invocations that occur in one operation of a message authentication algorithm and q is the number of authenticator generations.

In the case of CMAC, the upper bound value of the advantage of pseudorandomness is ½ when $q=O(2^{n/2}/L)$. This value q when the upper bound value is ½ will be denoted as $q_1$.

In order to ensure the security of a message authentication algorithm, the secret key of the message authentication algorithm is updated before q reaches $q_1$. That is, the larger the value of $q_1$, the longer the period in which one secret key can be used. Updating the secret key is costly, so that it is desirable that the key be updated less frequently. That is, it is important to design a message authentication algorithm in which the value of $q_1$ is large.

Non-Patent Literature 4 describes a message authentication algorithm in which $q_1=O(2^{2n/3}/L)$. In the message authentication algorithms described in Non-Patent Literature 2 and Non-Patent Literature 4, $q_1$ depends on the number L of block cipher invocations. For this reason, the larger the value of the number L of block cipher invocations, the smaller the value of $q_1$, so that the key is updated more frequently.

Non-Patent Literature 5 describes a message authentication algorithm in which $q_1=O(2^{n/2})$ and $q_1$ does not depend on the number L of block cipher invocations.

CITATION LIST

Non-Patent Literature

Non-Patent Literature 1: FIPS197, ADVANCED ENCRYPTION STANDARD (AES)

Non-Patent Literature 2: SP 800-38B, Recommendation for Block Cipher Modes of Operation: the CMAC. Mode for Authentication (May 2005)

Non-Patent Literature 3: Tetsu Iwata, Kaoru Kurosawa. OMAC: One-Key CBC MAC. FSE 2003. p 129-153

Non-Patent Literature 4: Kan Yasuda. A New Variant of PMAC: Beyond the Birthday Bound. CRYPTO 2011. p 596-609

Non-Patent Literature 5: Atul Luykx, Bart Preneel, Elmar Tischhauser, and Kan Yasuda. A MAC Mode for Lightweight Block Ciphers. FSE 2016. p 43-59

SUMMARY OF INVENTION

Technical Problem

It is an object of the present invention to enable realization of a message authentication algorithm in which the value of $q_1$ is a large value.

Solution to Problem

A message authenticator generation apparatus according to the present invention generates a message authenticator using a block cipher E having a block size n, and the message authenticator generation apparatus includes:

a hash function unit to calculate a value with a block cipher, taking as input message blocks obtained by dividing a message M and a counter value, and using the calculated value, calculate a hash value w of 2n bits;

a division unit to divide the hash value w of 2n bits into a value w[1] of n bits and a value w[2] of n bits;

a block cipher calculation unit to calculate a value z[1] with the block cipher E, taking as input the value w[1], and also calculate a value z[2] with the block cipher E, taking as input the value w[2]; and an authenticator calculation unit to calculate a message authenticator T not larger than the block size n for the message M by operating on both the value z[1] and the value z[2].

Advantageous Effects of Invention

In the present invention, a message authenticator is generated using a hash function h having an output length longer than a block size n and using two or more block ciphers. This makes a collision of outputs of the hash function less likely to occur, thereby increasing randomness of the authenticator. Thus, a message authentication algorithm in which the value of $q_1$ is a large value can be realized.

DESCRIPTION OF EMBODIMENTS

First Embodiment

*Description of Configuration*

Figure 1:
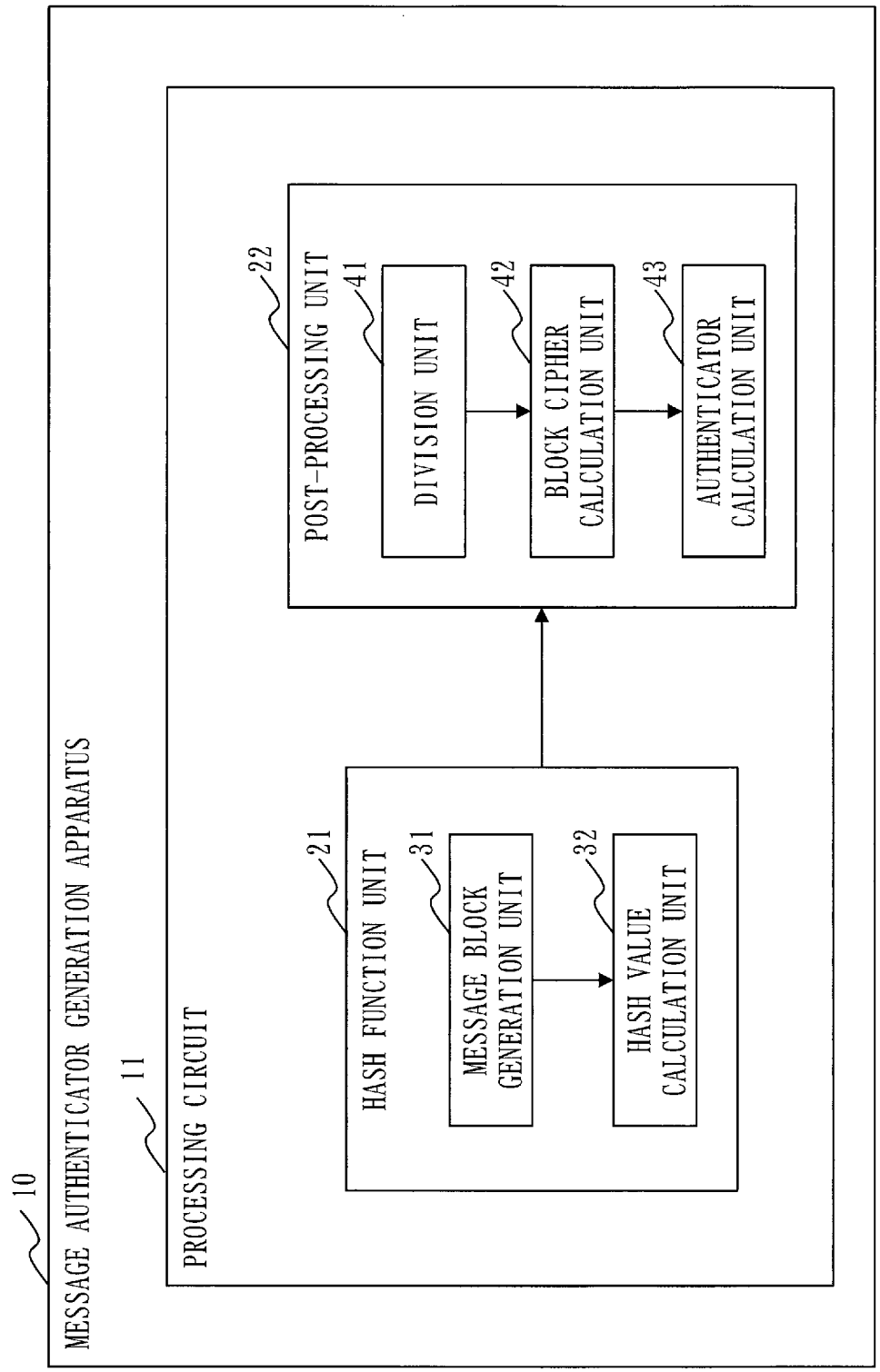
FIG. 1 is a configuration diagram of a message authenticator generation apparatus 10 according to a first embodiment.

A configuration of a message authenticator generation apparatus 10 according to a first embodiment will be described with reference to FIG. 1.

The message authenticator generation apparatus 10 has a processing circuit 11. The processing circuit 11 has a hash function unit 21 and a post-processing unit 22. The hash function unit 21 has a message block generation unit 31 and a hash value calculation unit 32. The post-processing unit 22 has a division unit 41, a block cipher calculation unit 42, and an authenticator calculation unit 43. The processing circuit 11 is a dedicated electronic circuit that realizes the functions of the hash function unit 21, the post-processing unit 22, the message block generation unit 31, the hash value calculation unit 32, the division unit 41, the block cipher calculation unit 42, and the authenticator calculation unit 43.

The processing circuit 11 is assumed to be a single circuit, a composite circuit, a programmed processor, a parallel programmed processor, a logic integrated circuit (IC), a gate array (GA), an application-specific integrated circuit (ASIC), or a field-programmable gate array (FPGA).

The functions may be realized by one processing circuit 11, or the functions may be realized by being distributed among a plurality of processing circuits 11.

Information, data, signal values, and variable values that indicate results of processes of the functions realized by the processing circuit 11 are stored in a storage area such as a register in the processing circuit 11.

*Description of Operation*

The operation of the message authenticator generation apparatus 10 according to the first embodiment will be described with reference to FIGS. 2 to 6.

The operation of the message authenticator generation apparatus 10 according to the first embodiment corresponds to a message authenticator generation method according to the first embodiment. The operation of the message authenticator generation apparatus 10 according to the first embodiment also corresponds to processes of a message authenticator generation program according to the first embodiment.

Figure 2:
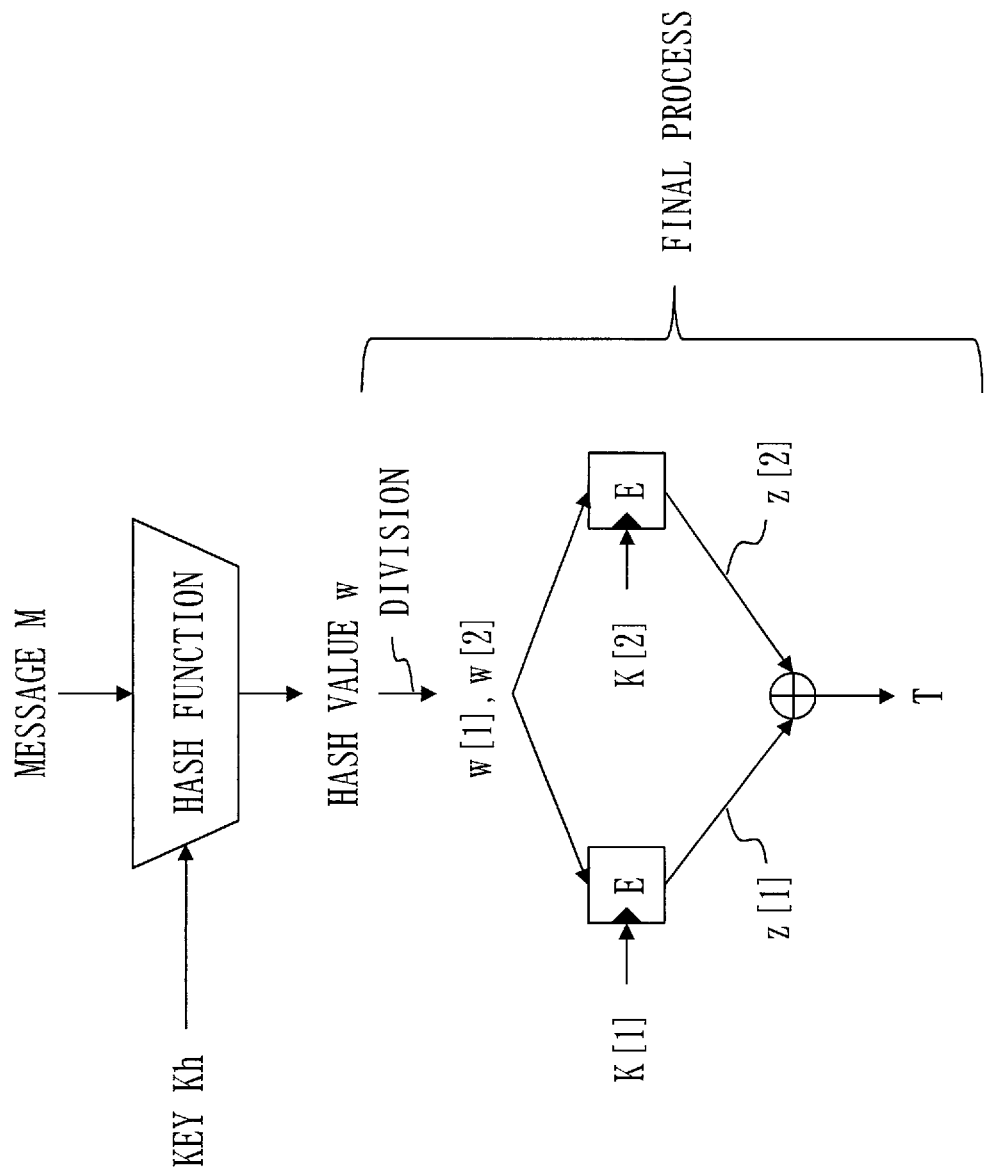
FIG. 2 is a configuration diagram of a message authentication algorithm according to the first embodiment.
Figure 3:
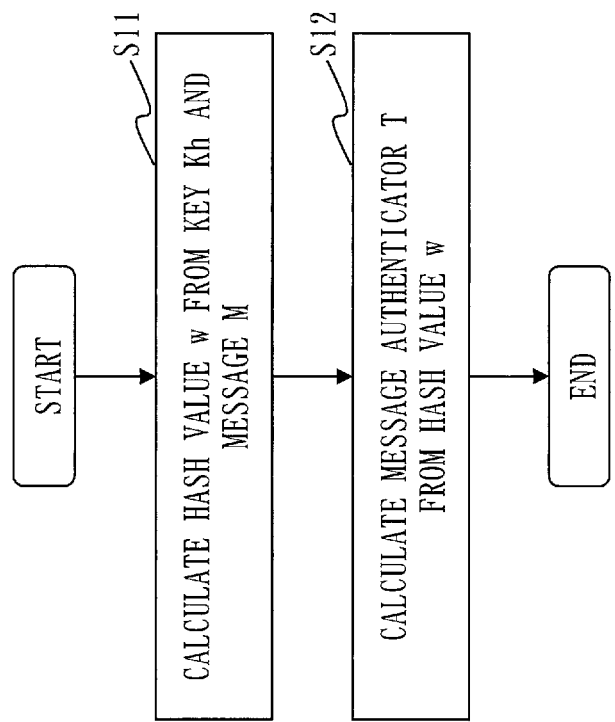
FIG. 3 is a flowchart illustrating the operation of the message authenticator generation apparatus 10 according to the first embodiment.

An outline of the operation of the message authenticator generation apparatus 10 according to the first embodiment will be described with reference to FIGS. 2 and 3.

(Step S11: Hash Function Process)

The hash function unit 21 receives input of a key Kh, which is a value of an arbitrary length in a key space Set(Kh), and a message M.

The hash function unit 21 calculates a hash value w with a hash function h having an output length of 2n bits, taking as input the key Kh and the message M. That is, the hash value w is 2n bits. In the first embodiment, the hash function unit 21 calculates a value with a block cipher, taking as input message blocks obtained by dividing the message M at every n bits and a counter value, and then using the calculated value, calculates the hash value w of 2n bits.

(Step S12: Final Process)

The post-processing unit 22 performs calculations using a block cipher E on the hash value w calculated by the hash function unit 21 in step S11 to calculate a message authenticator T not larger than a block size n for the message M.

The final process according to the first embodiment will be described with reference to FIGS. 2 and 4.

(Step S21: Division Process)

The division unit 41 divides the hash value w of 2n bits calculated by the hash function unit 21 in step S11 into a value w[1] of n bits and a value w[2] of n bits. For example, the division unit 41 separates n bits from the beginning of the hash value w as the value w[1] and the remaining n bits as the value w[2].

(Step S22: Block Cipher Calculation Process)

The block cipher calculation unit 42 receives input of a key K[1] of k bits and a key K[2] of k bits for the block cipher E.

The block cipher calculation unit 42 calculates a value z[1] with the block cipher E, taking as input the value w[1] obtained by division by the division unit 41 in step S21 and the key K[1]. The block cipher calculation unit 42 also calculates a value z[2] with the block cipher E, taking as input the value w[2] obtained by division by the division unit 41 in step S21 and the key K[2].

(Step S23: Authenticator Calculation Process)

The authenticator calculation unit 43 calculates, as a message authenticator T, a value obtained by an exclusive OR operation on the value z[1] and the value z[2] calculated by the block cipher calculation unit 42 in step S22, or a part of the value obtained by the exclusive OR operation.

An example of the hash function h according to the first embodiment will be described with reference to FIGS. 5 and 6.

(Step S31: Message Block Generation Process)

The message block generation unit 31 generates b message blocks from the message M, where b is an integer of 2 or more.

Specifically, the message block generation unit 31 generates data M' having a bit length of (n−s)b+n bits by padding processing, taking as input the message M. Then, the message block generation unit 31 divides the data M' from the beginning at every n−s bits to generate message blocks M[1], M[2], . . . , M[b−1] each having n−s bits and a message block M[b] having n bits.

Note here that s<n.

(Step S32: Input Block Generation Process)

The hash value calculation unit 32 combines each of at least some message blocks of the b message blocks with a counter value, which is different for each message block, so as to generate an input block.

Specifically, the message block M[i] generated in step S31 for each integer i of i=1, . . . , b−1 is combined with a counter value c[i] of s bits so as to generate an input block P[i] of n bits. The counter value c[i] is a bit string representing s bits of the value i.

The position of the counter value c[i] in the input block P[i] may be the beginning, the end, or an intermediate position, provided that it is a determined position.

(Step S33: Hash Value Generation Process)

The hash value calculation unit 32 calculates a hash value w, using the input blocks.

Specifically, the hash value calculation unit 32 calculates a value C[i] of n bits with the block cipher E, taking as input the input block P[i], for each integer i of i=1, . . . , b−1. Next, the hash value calculation unit 32 calculates a value x[1] and a value x[2], as indicated in Formula 11, using a value L[1, i] and a value L[2, i] for each integer i of i=1, . . . , b. Then, the hash value calculation unit 32 calculates x[1]∥x[2] which is a concatenation of the value x[1] and the value x[2], as the hash value w.

$$x[1]=L[1,1]\cdot C[1] \text{ xor} L[1,2]\cdot C[2] \text{ xor} \ldots \text{xor} L[1,b-1]\cdot C[b-1] \text{ xor} L[1,b]\cdot M[b],$$

$$x[2]=L[2,1]\cdot C[1] \text{ xor} L[2,2]\cdot C[2] \text{ xor} \ldots \text{xor} L[2,b-1]\cdot C[b-1] \text{ xor} L[2,b]\cdot M[b],$$ [Formula 11]

Note here that L[1, 1], L[1, 2], . . . , L[1, b] may be the same value or may be different values. L[2, 1], L[2, 2], . . . , L[2, b] are assumed to be different values. As a specific example, L[1, i]=1 and L[2, i]=$2^{b-i}$. L[1, i]·C[i] is a multiplication of L[1, i] and C[i] on a Galois filed GF($2^n$), for each integer i of i=1, . . . , b. Similarly, L[2,i]·C[i] is a multiplication of L[2, i] and C[i] on the Galois field GF($2^n$).

*Effects of First Embodiment*

The reason for $q_i=O(2^{n/2})$ in the message authentication algorithm described in Non-Patent Literature 5 is that the output length of a hash function used is n bits which is the block size of a block cipher. Since the output length of the hash function is n bits, a collision of outputs of the hash function can be caused to occur by $O(2^{n/2})$ hash function operations, using a birthday attack. Then, the message authentication algorithm can be attacked using this collision.

In the message authenticator generation apparatus 10 according to the first embodiment, a message authenticator is generated using the hash function h having an output length longer than the block size n. This makes a collision of outputs of the hash function less likely to occur, so that a message authentication algorithm in which the value of $q_1$ is a large value can be realized.

The reason why $q_1$ of the message authentication algorithms described in Non-Patent Literature 2 and Non-Patent Literature 4 depends on the number L of block cipher invocations is a collision between inputs of a block cipher used within a hash function.

In the message authenticator generation apparatus 10 according to the first embodiment, an input block to be an input of the block cipher E is generated by combining a message block with a counter value of s bits. This can prevent a collision between inputs of the block cipher E, so that a message authentication algorithm in which $q_1$ does not depend on the number L of block cipher invocations can be realized.

The block cipher E is assumed to be a pseudorandom permutation and the hash function is assumed to be a $(O(\frac{1}{2}^{2n}), O(\frac{1}{2}^{2n}))$-partial almost universal hash function. Then, $q_1=O(2^{2n/3})$ in the message authentication algorithm realized by the message authenticator generation apparatus 10 according to the first embodiment.

A ($p_1$, $p_2$)-partial almost universal hash function is a hash function such that for a key Kh of the hash function and two different inputs M and M' of the hash function, the probability that the leading n bits of H(Kh, M) and the leading n bits of H(Kh, M') will be the same is less than or equal to $p_1$, and the probability that the last n bits of H(Kh, M) and the last n bits of H(Kh, M') will be the same is less than or equal to $p_2$.

Figure 5:
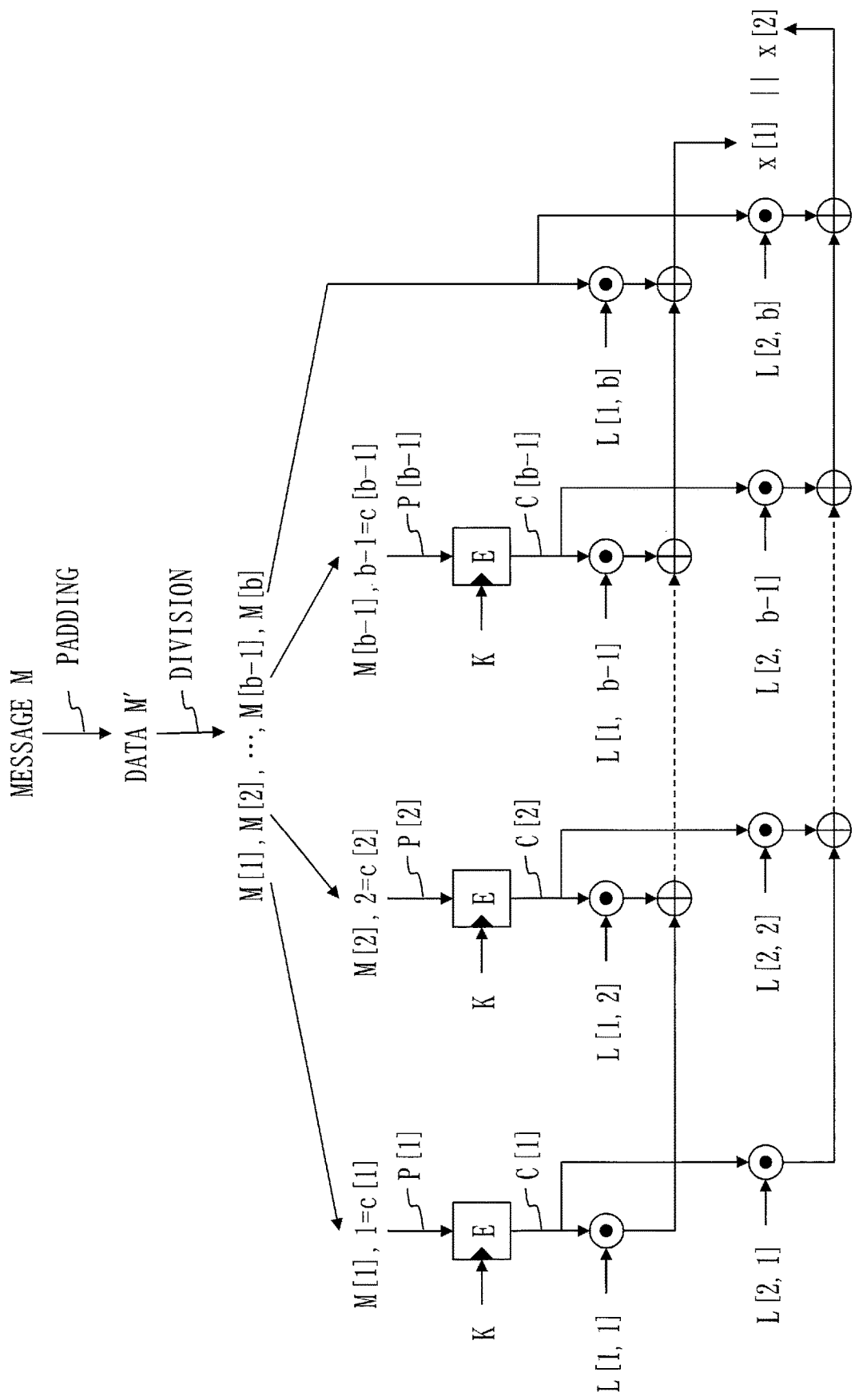
FIG. 5 is a configuration diagram of a hash function h according to the first embodiment.
Figure 6:
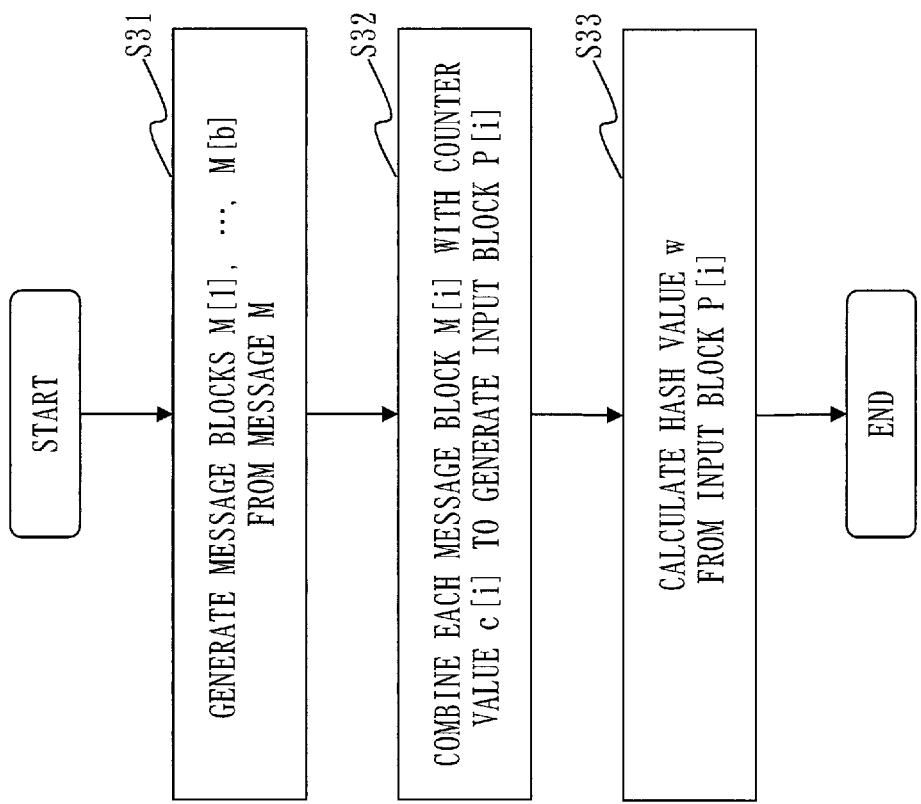
FIG. 6 is a flowchart of a hash function process according to the first embodiment.

Assuming that the block cipher is a pseudorandom permutation, the hash function h described with reference to FIGS. 5 and 6 is a $(O(\frac{1}{2}^{2n}), O(\frac{1}{2}^{2n}))$-partial almost universal hash function. Therefore, assuming that the block cipher is a pseudorandom permutation, $q_1=O(2^{2n/3})$ in the message authentication algorithm realized by the message authenticator generation apparatus 10 according to the first embodiment using the hash function h described with reference to FIGS. 5 and 6.

*Other Configurations*

<First Variation>

In the first embodiment, the message authenticator generation apparatus 10 has the processing circuit 11 which is a dedicated electronic circuit for realizing the functions. The functions may also be realized by software.

A configuration of a message authenticator generation apparatus 10 according to a first variation will be described with reference to FIG. 7.

The message authenticator generation apparatus 10 is a computer.

The message authenticator generation apparatus 10 has hardware of a processor 12, a memory 13, and a storage 14. The processor 12 is connected with other hardware components via signal lines and controls the other hardware components.

The storage 14 stores a program for realizing functional components of the message authenticator generation apparatus 10. This program is loaded into the memory 13 by the processor 12 and executed by the processor 12. In this way, the functions of the functional components of the message authenticator generation apparatus 10 are realized.

The processor 12 is an integrated circuit (IC) that performs processing. Specifically, the processor 12 is a central processing unit (CPU), a digital signal processor (DSP), or a graphics processing unit (GPU).

The memory 13 is a storage device to temporarily store data. As a specific example, the memory 13 is a static random access memory (SRAM) or a dynamic random access memory (DRAM).

The storage 14 is a storage device to store data. As a specific example, the storage 14 is a hard disk drive (HDD). The storage 14 may also be a portable storage medium, such as a Secure Digital (SD, registered trademark) memory card, CompactFlash (CF), NAND flash, a flexible disk, an optical disc, a compact disc, a Blu-ray (registered trademark) disc, or a digital versatile disc (DVD).

Information, data, signal values, and variable values that indicate results of processes of the functions realized by the processor 12 are stored in the memory 13 or the storage 14, or a storage area such as a register or a cache memory in the processor 12.

Figure 7:
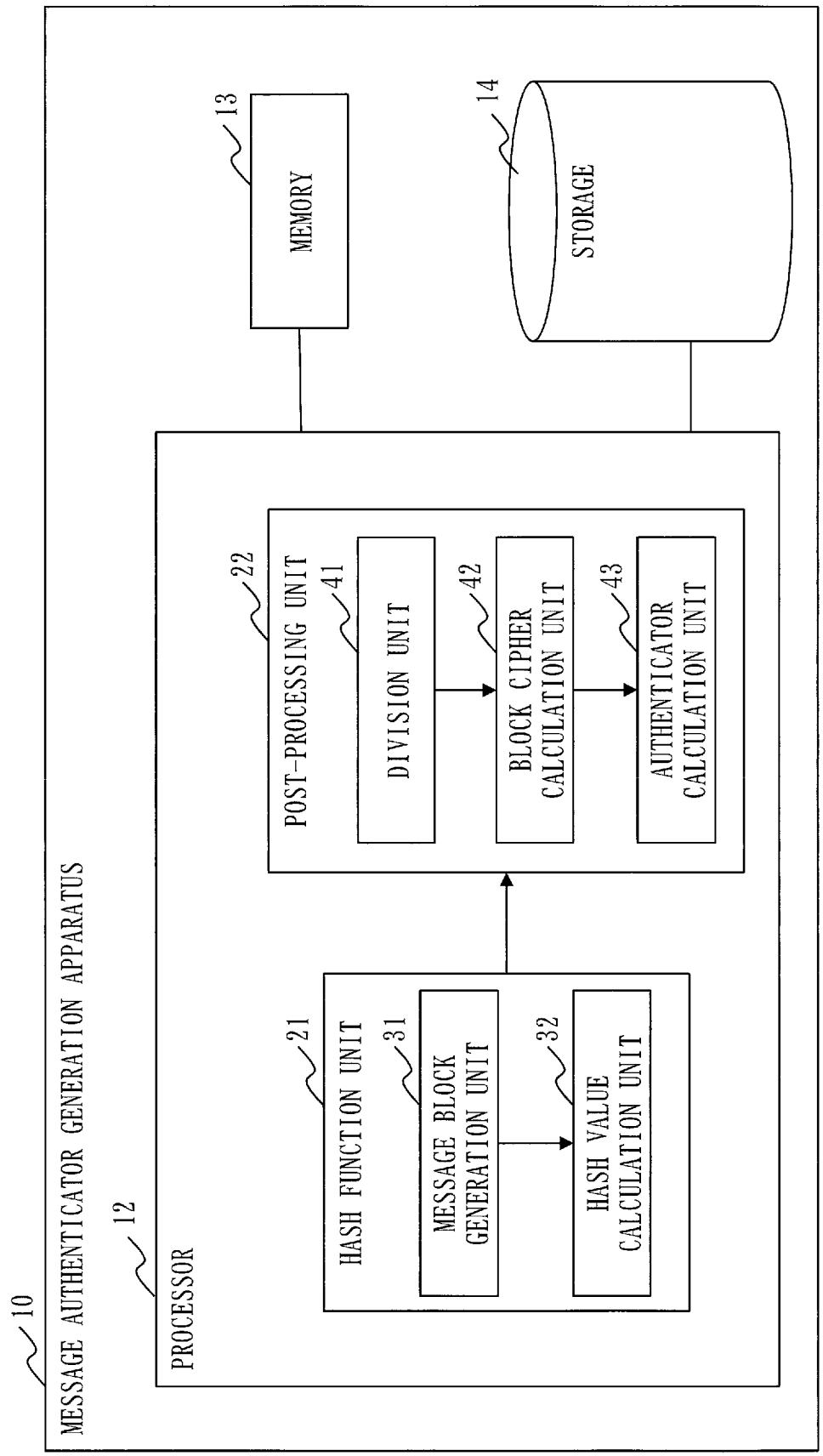
FIG. 7 is a configuration diagram of a message authenticator generation apparatus 10 according to a first variation.

In FIG. 7, only one processor 12 is illustrated. However, the message authenticator generation apparatus 10 may have a plurality of processors, and the plurality of processors may cooperate to execute the program for realizing the functions.

<Second Variation>

Some of the functions may be realized by hardware, and the rest of the functions may be realized by software. Alternatively, the functions may be realized by firmware. That is, some functions of the functional components of the message authenticator generation apparatus may be realized by hardware and the rest of the functions may be realized by software.

Second Embodiment

A second embodiment differs from the first embodiment in the configuration of the final process. In the second embodiment, this difference will be described, and description of the same portions will be omitted.

*Description of Configuration*

Figure 8:
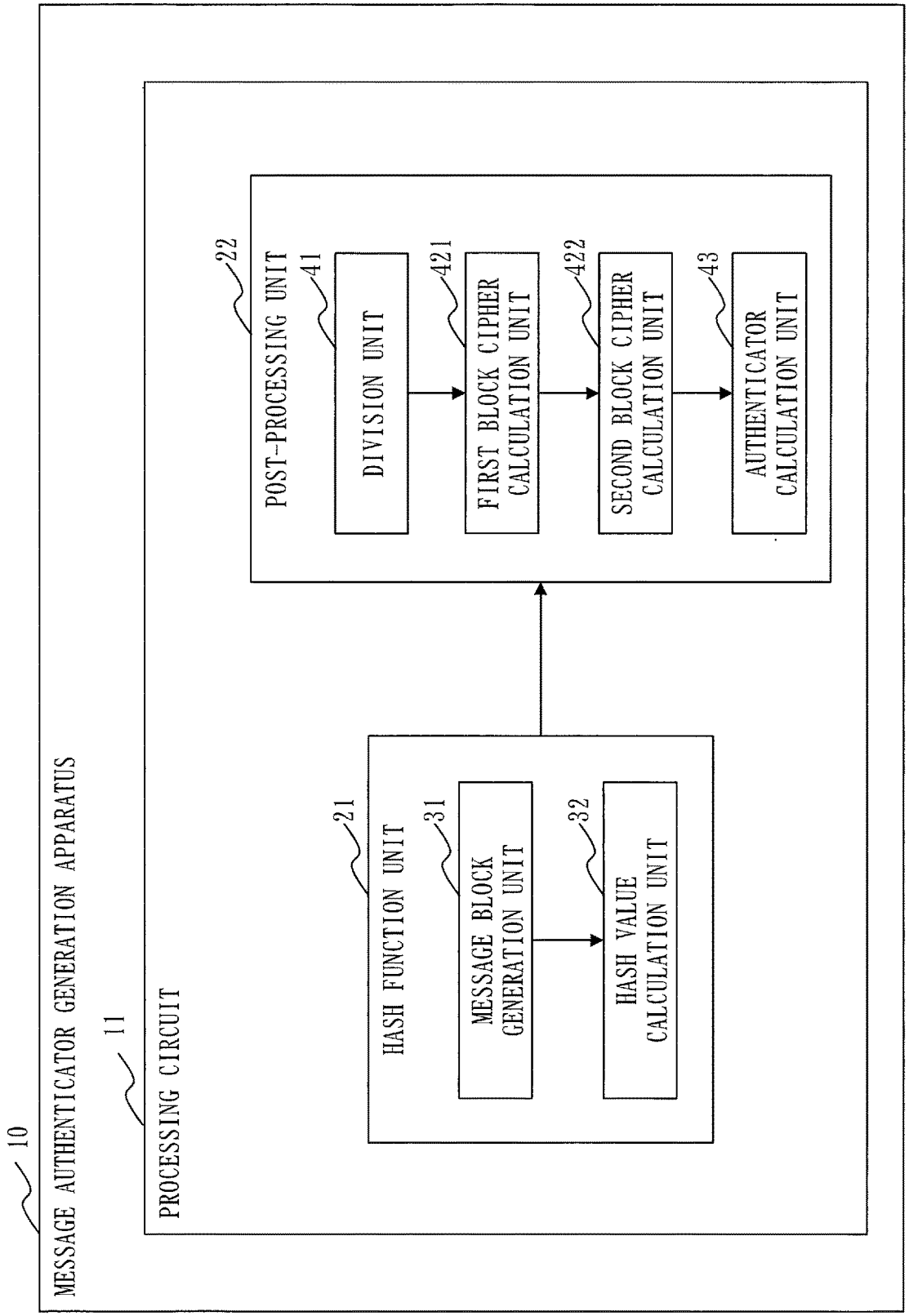
FIG. 8 is a configuration diagram of a message authenticator generation apparatus 10 according to a second embodiment.

A configuration of a message authenticator generation apparatus 10 according to the second embodiment will be described with reference to FIG. 8.

The message authenticator generation apparatus 10 differs from the message authenticator generation apparatus 10 illustrated in FIG. 1 in that the post-processing unit 22 has a first block cipher calculation unit 421 and a second block cipher calculation unit 422, in place of the block cipher calculation unit 42.

*Description of Operation*

Figure 9:
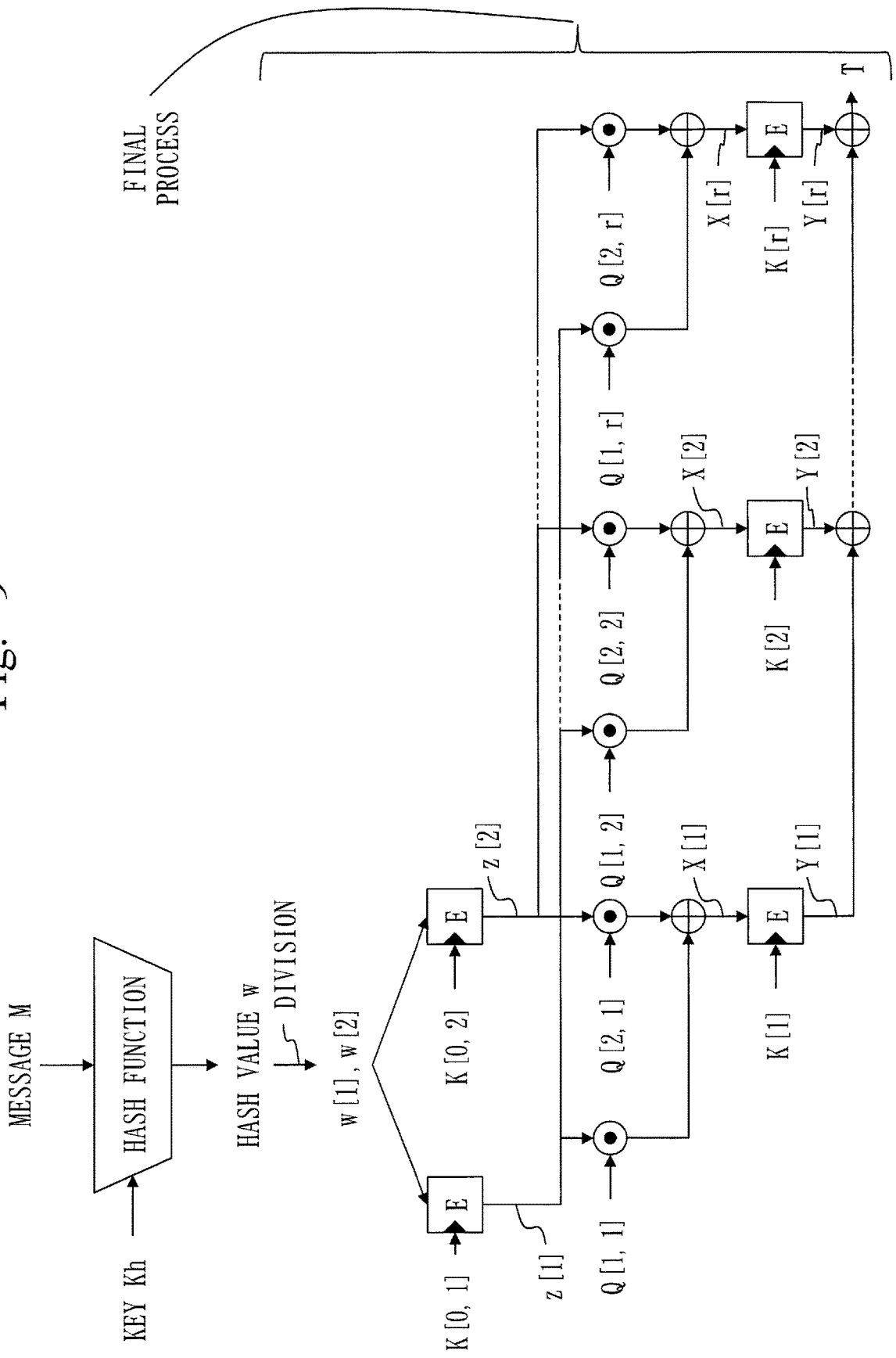
FIG. 9 is a configuration diagram of a message authentication algorithm according to the second embodiment.

The operation of the message authenticator generation apparatus 10 according to the second embodiment will be described with reference to FIGS. 9 to 10.

The operation of the message authenticator generation apparatus 10 according to the second embodiment corresponds to a message authenticator generation method according to the second embodiment. The operation of the message authenticator generation apparatus 10 according to the second embodiment also corresponds to processes of a message authenticator generation program according to the second embodiment.

A hash function process is the same as in the first embodiment. That is, the hash function unit 21 calculates a hash value w with a hash function h having an output length of 2n bits, taking as input a key Kh and a message M. However, the hash function unit 21 does not have to calculate a value with a block cipher, taking as input message blocks obtained by dividing the message M at every n bits and a counter value, and using the calculated value, calculate a hash value w of 2n bits, as described in the first embodiment.

A final process according to the second embodiment will be described with reference to FIGS. 9 and 10.

Figure 4:
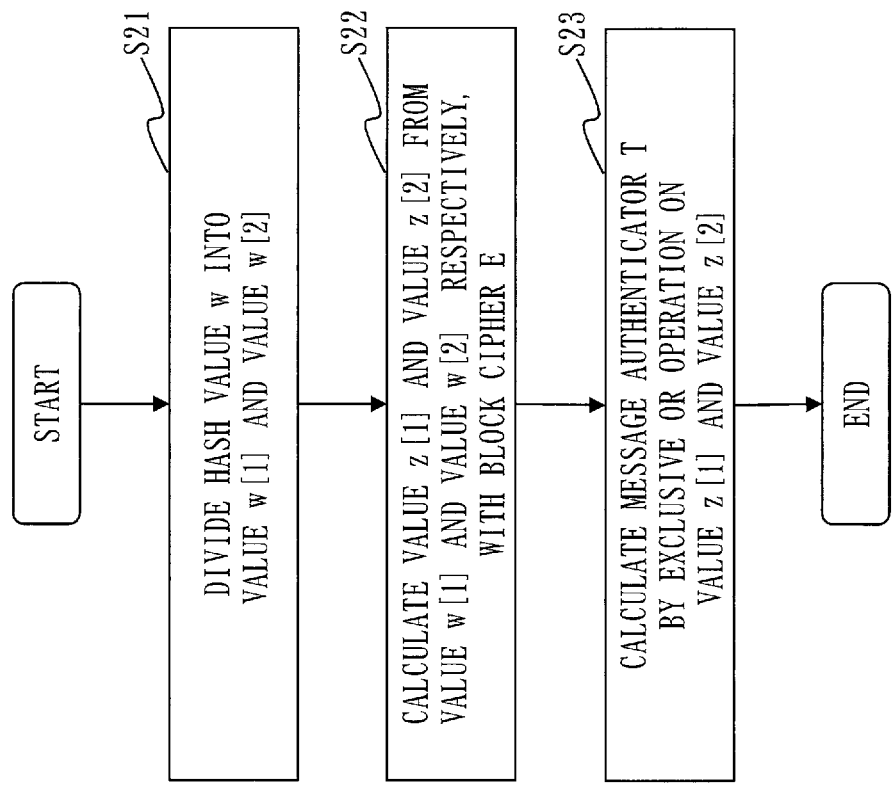
FIG. 4 is a flowchart of a final process according to the first embodiment.

Step S41 is the same as step S21 of FIG. 4.

(Step S42: First Block Cipher Calculation Process)

The first block cipher calculation unit 421 receives input of a key K[0, 1] of k bits and a key K[0, 2] of k bits for a block cipher E.

The first block cipher calculation unit 421 calculates a value z[1] with the block cipher E, taking as input the value w[1] obtained by division by the division unit 41 in step S41 and the key K[0, 1]. The first block cipher calculation unit 421 also calculates a value z[2] with the block cipher E, taking as input the value w[2] obtained by division by the division unit 41 in step S41 and the key K[0, 2].

(Step S43: Second block cipher calculation process)

The second block cipher calculation unit 422 receives input of a key K[i] of k bits for the block cipher E, for each integer i of i=1, . . . , r, where r is an integer of 1 or more.

The second block cipher calculation unit 422 calculates a value X[i], as indicated in Formula 12, using a value Q[1, i] and a value Q[2, i] as well as the value z[1] and the value z[2] calculated by the first block cipher calculation unit 421 in step S42, for each integer i of i=1, . . . , r.

$$X[i]=Q[1,i]\cdot z[1] \text{ xor } Q[2,i]\cdot z[2]$$ [Formula 12]

Note here that $Q[1, 1], Q[1, 2], \ldots, Q[1, r]$ may be the same value or may be different values. $Q[2, 1], Q[2, 2], \ldots, Q[2, r]$ are assumed to be different values. As a specific example, $Q[1, i]=1$ and $Q[2, i]=2^{i-1}$. $Q[1, i]\cdot z[1]$ is a multiplication of $Q[1, i]$ and $z[1]$ on the Galois field, for each integer i of i=1, r. Similarly, $Q[2, i]\cdot z[2]$ is a multiplication of $Q[2, i]$ and $z[2]$ on the Galois field.

Then, the second block cipher calculation unit 422 calculates a value Y[i] with the block cipher E, taking as input the calculated value X[i] and the key K[i], for each integer i of i=1, . . . , r.

(Step S44: Authenticator calculation process)

The authenticator calculation unit 43 calculates, as a message authenticator T, a value obtained by an exclusive OR operation on the value Y[i] for each integer i of i=1, r calculated by the second block cipher calculation unit 422 in step S43, or a part of the value obtained by the exclusive OR operation.

*Effects of Second Embodiment*

The block cipher E is assumed to be a pseudorandom permutation, and the hash function h is assumed to be a $O(\frac{1}{2}2^n)$-almost universal hash function. Then, $q_1=O(2^{m/(t+1)})$ in a message authentication algorithm realized by the message authenticator generation apparatus 10 according to the second embodiment.

A p-almost universal hash function is a hash function such that for a key Kh of the hash function and two different inputs M and M' of the hash function, the probability that H(Kh, M)=H(Kh, M') is less than or equal to p.

Assuming that the block cipher E is a pseudorandom permutation, $q_1=O(2^{m/(t+1)})$ in the message authentication algorithm realized by the message authenticator generation apparatus 10 according to the second embodiment using the hash function h described with reference to FIGS. 5 and 6.

Note that the final process of the message authenticator generation apparatus 10 according to the first embodiment and the final process of the message authenticator generation apparatus 10 according to the second embodiment differ in the configuration.

However, if the final process of the message authenticator generation apparatus 10 according to the first embodiment is considered as described below, then it can be seen that the final process of the message authenticator generation apparatus 10 according to the first embodiment and the final process of the message authenticator generation apparatus 10 according to the second embodiment have the common configuration in many respects.

Figure 10:
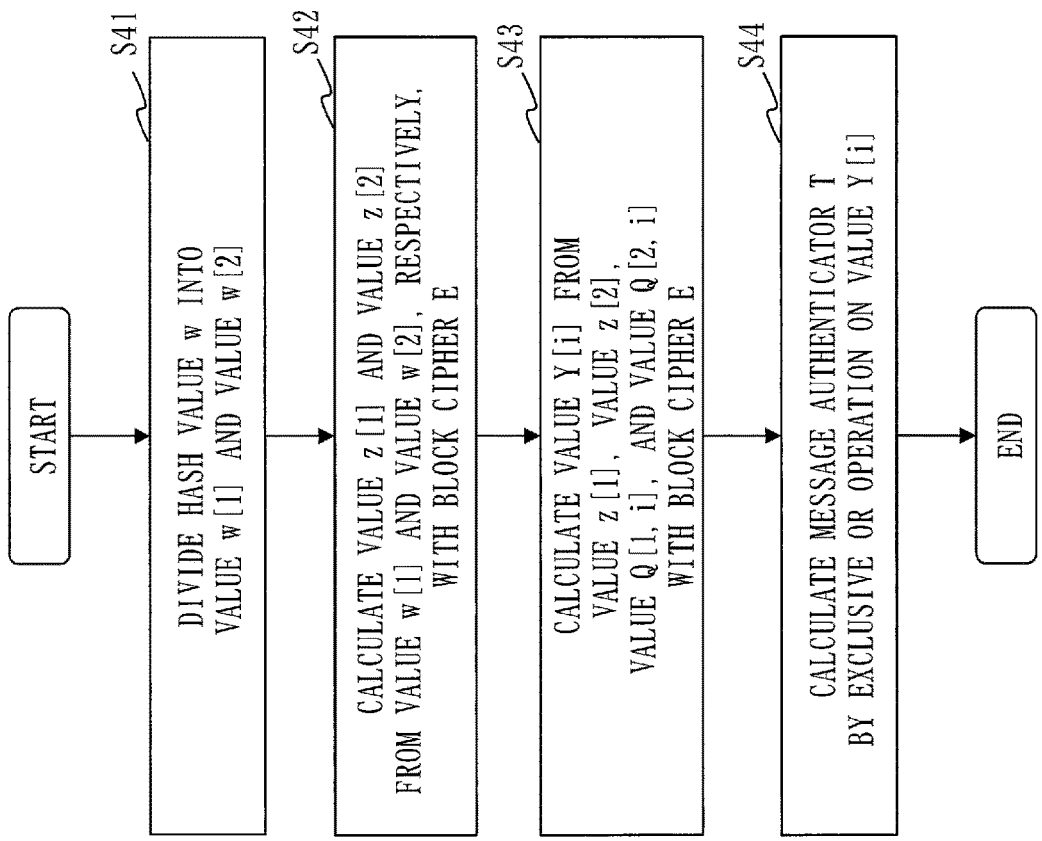
FIG. 10 is a flowchart of a final process according to the second embodiment.

In step S22 of FIG. 4, the block cipher calculation unit 42 substitutes the value w[1] for the value z[1], and substitutes the value w[2] for the value z[2] (corresponding to step S42 of FIG. 10). Then, in step S22 of FIG. 4, the block cipher calculation unit 42 calculates a value X[i] indicated in Formula 12, using a value Q[1, i] and a value Q[2, i] as well as the value z[1] and z[2], and calculates a value Y[i] with the block cipher E, taking as input the calculated value X[i], for each integer i of i=1, . . . , r, where r=2, the value Q[1, 1] is 1, the value Q[2, 1] is 0, the value Q[1, 2] is 0, and the value Q[2, 2] is 1 (corresponding to step S43 of FIG. 10).

In step S23 of FIG. 4, the authenticator calculation unit 43 calculates, as a message authenticator T, a value obtained by an exclusive OR operation on the value Y[i] for each integer i of i=1, . . . r, or a part of the value obtained by the exclusive OR operation (corresponding to step S44 of FIG. 10).

REFERENCE SIGNS LIST

10: message authenticator generation apparatus, 11: processing circuit, 12: processor, 13: memory, 14: storage, 21: hash function unit, 22: post-processing unit, 31: message block generation unit, 32: hash value calculation unit, 41: division unit, 42: block cipher calculation unit, 43: authenticator calculation unit

The invention claimed is:

1. A message authenticator generation apparatus that generates a message authenticator for use in a message authentication algorithm which may be used to detect tampering of a transmitted message and that increases the randomness of the authenticator and the time period in which a secret key may be used, the message authenticator using a block cipher E having a block size n, the message authenticator generation apparatus comprising:
processing circuitry to:
calculate a hash value w of 2n bits, taking as input a message M;
divide the hash value w of 2n bits into a value w[1] of n bits and a value w[2] of n bits;
calculate a value z[1] with the block cipher E, taking as input the value w[1], and also calculate a value z[2] with the block cipher E, taking as input the value w[2];
calculate a value X[i] indicated in Formula 1, using a value Q[1, i] and a value Q[2, i] as well as the value z[1] and the value z[2], and calculate a value Y[i] with the block cipher E, taking as input the calculated value X[i], for each integer i of i=1, . . . , r, where r is an integer of 1 or more;
calculate a message authenticator T not larger than the block size n for the message M by operating on the value Y[i] for each integer i of i=1, . . . , r $$X[i] = Q[1,i] \cdot z[1] \text{ xor } Q[2,i] \cdot z[2] \qquad \text{[Formula 1]}$$

where · is a multiplication on a Galois field GF($2^n$); and
authenticate the input message M by comparing the calculated message authenticator T with an authenticator T' received with the input message.

2. The message authenticator generation apparatus according to claim 1, wherein the processing circuitry calculates, as the message authenticator T, a value obtained by an exclusive OR operation on the value Y[i] for each integer i of i=1, . . . , r, or a part of the value obtained by the exclusive OR operation.

3. The message authenticator generation apparatus according to claim 2, wherein
the processing circuitry generates b message blocks M[1], . . . , M[b] from the message M, where b is an integer of 2 or more; and
combines each of at least some of the generated b message blocks with a counter value, which is different for each message block, so as to generate an input block, and calculate a hash value w, using the input block.

4. The message authenticator generation apparatus according to claim 3, wherein the processing circuitry
combines a message block M[i] with the counter value c[i], so as to generate an input block P[i] of n bits, for each integer i of i=1, . . . , b−1;
calculates a value C[i] of n bits with the block cipher E, taking as input the input block P[i], for each integer i of i=1, . . . , b−1;
calculates a value x[1] and a value x[2] indicated in Formula 2, using a value L[1, i] and a value L[2, i], for each integer i of i=1, b; and
concatenates the value x[1] and the value x[2] so as to calculate the hash value w $$x[1] = L[1,1] \cdot C[1] \text{ xor } L[1,2] \cdot C[2] \text{ xor } \ldots \text{ xor } L[1,b-1] \cdot C[b-1] \text{ xor } L[1,b] \cdot M[b], x[2] = L[2,1] \cdot C[1] \text{ xor } L[2,2] \cdot C[2] \text{ xor } \ldots \text{ xor } L[2,b-1] \cdot C[b-1] \text{ xor } L[2,b] \cdot M[b] \qquad \text{[Formula 2]}$$

where · is a multiplication on a Galois field GF($2^n$).

5. The message authenticator generation apparatus according to claim 4, wherein the value L[1, i] is 1 and the value L[2, i] is $2^{b-i}$.

6. The message authenticator generation apparatus according to claim 1, wherein
the processing circuitry generates b message blocks M[1], . . . , M[b] from the message M, where b is an integer of 2 or more; and
combines each of at least some of the generated b message blocks with a counter value, which is different for each message block, so as to generate an input block, and calculate a hash value w, using the input block.

7. The message authenticator generation apparatus according to claim 6, wherein the processing circuitry
combines a message block M[i] with the counter value c[i], so as to generate an input block P[i] of n bits, for each integer i of i=1, . . . , b−1;
calculates a value C[i] of n bits with the block cipher E, taking as input the input block P[i], for each integer i of i=1, . . . , b−1;
calculates a value x[1] and a value x[2] indicated in Formula 2, using a value L[1, i] and a value L[2, i], for each integer i of i=1, . . . , b; and
concatenates the value x[1] and the value x[2] so as to calculate the hash value w $$x[1] = L[1,1] \cdot C[1] \text{ xor } L[1,2] \cdot C[2] \text{ xor } \ldots \text{ xor } L[1,b-1] \cdot C[b-1] \text{ xor } L[1,b] \cdot M[b], x[2] = L[2,1] \cdot C[1] \text{ xor } L[2,2] \cdot C[2] \text{ xor } \ldots \text{ xor } L[2,b-1] \cdot C[b-1] \text{ xor } L[2,b] \cdot M[b] \qquad \text{[Formula 2]}$$

where · is a multiplication on a Galois field GF($2^n$).

8. The message authenticator generation apparatus according to claim 7, wherein the value L[1, i] is 1 and the value L[2, i] is $2^{b-i}$.

* * * * *